United States Patent Office 3,120,509
Patented Feb. 4, 1964

3,120,509
PROCESS FOR THE MANUFACTURE OF
VITAMINS OF THE GROUP $B_{12}$
Konrad Bernhauer, Gerlingen, near Stuttgart, and Wilhelm Friedrich, Hamburg, Germany, and Paul Zeller, Allschwil, Switzerland, assignors to Hoffmann-La Roche Inc., Nutley, N.J., a corporation of New Jersey
No Drawing. Filed Dec. 8, 1960, Ser. No. 74,444
Claims priority, application Switzerland Dec. 16, 1959
5 Claims. (Cl. 260—211.5)

The present invention concerns a process for manufacturing compounds containing a cation of Formula I. In this formula, $R_1$ represents hydrogen, an alkyl, aryl or carbalkoxy group, $R_2$, $R_3$ and $R_4$ stand for hydrogen or an alkyl group, $R_5$ and $R_6$ represent hydrogen, halogen, an alkyl alkoxy, hydroxy, mercapto or alkylmercapto group. The positive charge of the cation of Formula I may in said compounds be compensated by any desired anions, for example by cyanide, halide, such as chloride or bromide, sulfate, phosphate, or hydroxy ions. Part of the electric charge may also be compensated intramolecularly

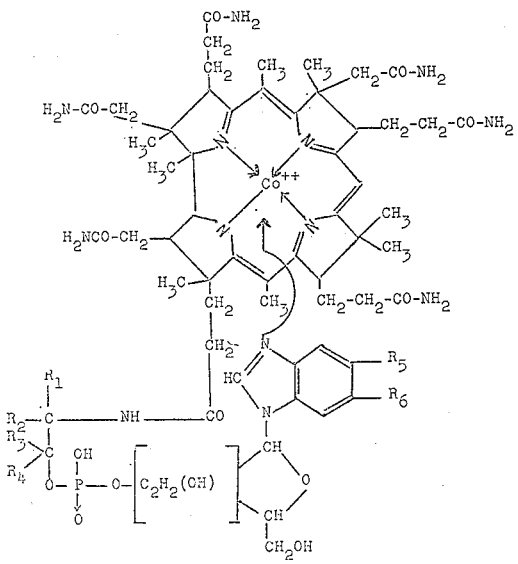

The process provided by the invention comprises in a general aspect, condensing a compound, which contains the cation of cobyrinic acid-*abcdeg*-hexamide of Formula II, with an amine of Formula III.

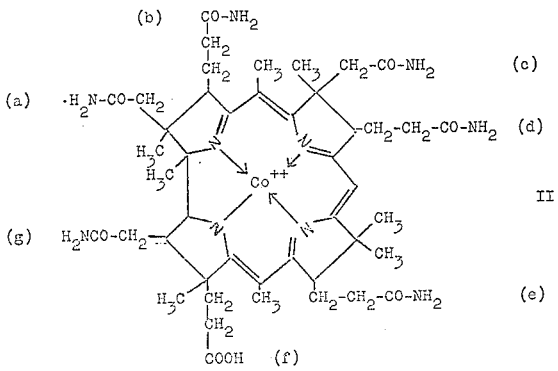

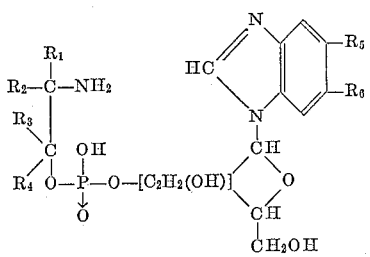

Cobyrinic acid-*abcdeg*-hexamide is called hereinafter factor $V_{1a}$. The anion which compensates the positive charge of the said cation may be for example a cyanide, halide, sulfate, phosphate or hydroxy ion. Part of the positive charge of the central atom may also be compensated intramolecularly.

The factor $V_{1a}$ which is used as starting material may be isolated from anaerobic digested sludge, for example as follows:

16 cubic meters of anaerobic digested sludge obtained from a sewage purification plant in Darmstadt-Eberstadt, Germany, is worked up to a kieselguhr concentrate in the manner described in German Federal Republic Patent No. 922,126. Upon chromatographic separation of this concentrate on a cellulose column, using as eluant n-butanol, which is saturated with water and potassium perchlorate and contains 3 ml. of 10% hydrocyanic acid solution per liter, there is obtained a fraction intermediate to the vitamin $B_{12}$ fraction and the factor III fraction, containing the factor $V_{1a}$. By concentrating this intermediate fraction in vacuo, there is obtained an aqueous concentrate which is purified by extraction with phenol and precipitation with p-chlorophenol on kieselguhr. The thus obtained kieselguhr product is subjected to chromatography on cellulose powder, using n-butanol with 15% water and 0.5 ml. of 10% hydrocyanic acid per liter as eluate. Under these conditions, $B_{12}$ factors present are eluted in the following sequence: factor 1b, vitamin $B_{12}$, 5-methylbenzimidazole-cobalamine, benzimidazole-cobalamine, 2-methylmercaptoadenine-cobalamine and factor III. Finally, there is obtained a fraction which travels only slowly and which contains the factor $V_{1a}$. This fraction is concentrated in vacuo and subjected to electrophoresis at pH 2.7 in 0.5 N acetic acid with addition of 0.005% hydrocyanic acid. In this procedure, factor $V_{1a}$ migrates to the cathode, whereas the remainder of the fraction does not migrate and is separated. Elution is performed with water, the aqueous solution is purified by extracting with phenol and then evaporating in vacuo. The dry residue is triturated with acetone, the acetone is evaporated and the residue remaining after evaporation of the acetone is dried in vacuo. There is thus obtained a violet-red amorphous powder containing about 70% of factor $V_{1a}$. The product obtained can be subjected to a further purification treatment by passing a rather concentrated aqueous solution of the substance through a column of cellulose powder, the purity grade of the product being then 90%, which is sufficient for further treatment. The cobyrinic acid-*abcdeg*-hexamide thus obtained shows at pH 6.5 and in the presence of cyanide ions the same absorption spectrum as factor B-dicyanide with the typical maximum at 367 m$\mu$. The paper electrophoretic behaviour in the presence of cyanide-ions is: at pH 2.7 basic and at pH 6.5 monoacidic.

As the second reactant in the process of the invention, there can be employed amines of Formula III, wherein $R_1$ stands for hydrogen; an alkyl group, preferably a lower alkyl group, for example methyl, ethyl, propyl, isopropyl, n-butyl, isobutyl; an aryl group, such as phenyl or tolyl; or a phenyl lower alkyl group, such as benzyl; $R_2$, $R_3$ and $R_4$ are selected from the group consisting of hydrogen, an alkyl group, preferably a lower alkyl group, aryl and carbalkoxy, such as carbomethoxy; $R_5$ and $R_6$ represent hydrogen; halogen, such as chlorine or bromine; an alkyl group, preferably a lower alkyl group, such as methyl, ethyl, propyl, isopropyl, n-butyl, isobutyl; a lower alkoxy group, such as methoxy, ethoxy or propoxy; a hydroxy-mercapto- or lower alkyl-mercapto group, such as methylmercapto, ethylmercapto, and the like. Especially preferred amines of Formula III are for example the following:

(1-α-D-ribofuranosyl-5,6-dimethylbenzimidazol)-3'(or 2')-[(DL-2-amino-1-methyl-ethyl)-hydrogenphosphoric acid ester];

(1-α-D-ribofuranosyl-5,6-dimethylbenzimidazol)-3'(or 2')-[(D-2-amino-1-methyl-ethyl)-hydrogenphosphoric acid ester];

(1-α-D-ribofuranosyl-5,6-dimethylbenzimidazol)-3'(or 2')-[(L-2-amino-1-methyl-ethyl)-hydrogenphosphoric acid ester];

(1-α-D-ribofuranosyl-5,6-dimethylbenzimidazol)-3'(or 2')-[(1-methyl-1-carbomethoxy-2-amino-ethyl)-hydrogenphosphoric acid ester];

(1-α-D-ribofuranosyl-5,6-dimethylbenzimidazol)-3'(or 2')-[(2-amino-ethyl)-hydrogenphosphoric acid ester];

(1-α-D-ribofuranosyl-5-methylbenzimidazol)-3'(or 2')-[(D-2-amino-1-methyl-ethyl)-hydrogenphosphoric acid ester];

(1-α-D-ribofuranosyl-6-methylbenzimidazol)-3'(or 2')-[(D-2-amino-1-methyl-ethyl)-hydrogenphosphoric acid ester];

(1-α-ribofuranosyl-5-methoxybenzimidazol)-3'(or 2')-[(D-2-amino-1-methyl-ethyl)-hydrogenphosphoric acid ester];

(1-α-D-ribofuranosyl-5-hydroxybenzimidazol)-3'(or 2')-[(D-2-amino-1-methyl-ethyl)-hydrogenphosphoric acid ester];

(1-α-D-ribofuranosyl-5,6-dichlorobenzimidazol)-3'(or 2')-[(D-2-amino-1-methyl-ethyl)-hydrogenphosphoric acid ester];

(1-α-D-ribofuranosyl-5,6-dimethylbenzimidazol)-3'(or 2')-[(DL-1-phenyl-2-amino-ethyl)-hydrogenphosphoric acid ester];

(1-α-D-ribofuranosyl-5,6-dimethylbenzimidazol)-3'(or 2')-[(DL-1-cetyl-2-amino-ethyl)-hydrogenphosphoric acid ester];

The synthetic production of the said amines is best performed by reacting a cyclic phosphate of the general formula

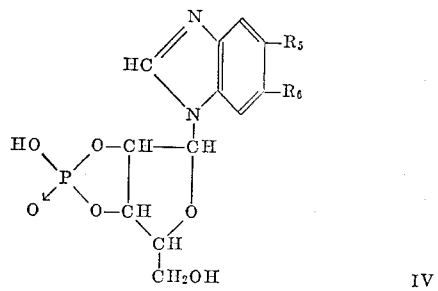

IV with an amino alcohol, the amino group of which is protected by temporary conversion thereof into a suitable derivative (for example the carbobenzoxy- or the benzylidene derivative). By way of example, (1-α-D-ribofuranosyl-5,6-dimethylbenzimidazol)-3'(or 2')-[(DL-2-amino-1-methyl-ethyl)-hydrogenphosphoric acid ester] may be produced according to the following mode of procedure:

(1-α-D-ribofuranosyl-5,6-dimethylbenzimidazol)-2' (or 3')-dihydrogenphosphoric acid ester is converted by treatment with dicyclohexyl-cabodiimide into the 2',3'-cyclic phosphate (Formula IV, $R_5=R_6=$methyl). Reacting this cyclic phosphate with DL-1-benzyloxycarbonyl amino-2-propanol or with the Schiff base obtained from DL-1-amino-2-propanol and benzaldehyde in the presence of basic catalysts (hydrochloric acid, potassium tert. butylate) yields the desired compounds from which the amino protecting group may be split off by hydrolysis or hydrogenolysis. The amines of Formula IV may advantageously be stored in the form of their calcium salts.

A preferred mode of carrying out the process provided by the invention comprises treating the amine of Formula III with a reactive derivative of the acid of Formula II. A suitable reactive derivative is for example an ester, e.g., the methyl or ethyl ester, or still better a so-called activated ester, e.g., the cyanomethyl ester, the thiophenyl ester or the p-nitrophenyl ester. Especially suitable are also anhydrides, for example mixed anhydrides that can be obtained by reaction of the acid with a chloroformic acid ester in the presence of a tertiary base.

An especially appropriate mode of execution of the process of the invention comprises effecting the condensation in the presence of a carbodiimide. Aromatic, aliphatic and cycloaliphatic representatives of the latter class of compounds can be employed, e.g., p-ditolylcarbodiimide, di-tert.butyl-carbodiimide and di-cyclohexyl-carbodiimide. When employing a carbodiimide, the preparation of a reactive derivative of the acid is unnecessary and moreover the reaction can be effected in water or in a water-containing solvent medium, wherein the factor $V_{1a}$ employed as starting material is soluble.

As solvent media for carrying out the process of the invention, there can be used water and water-miscible solvents, such as acetone, dioxane, tetrahydrofuran, formamide, dimethylformamide and lower alkanols, e.g. methanol, ethanol and isopropanol. Also particularly suitable are chlorinated hydrocarbons, e.g., methylene chloride and chloroform, as well as aromatic hydrocarbons, e.g., benzene and toluene. Additional suitable solvents include, for example, pyridine and its homologs, e.g., lutidine, which can be employed in admixture with water and also with the other solvents mentioned above.

In view of the sensitivity of the starting materials and the end products, it is advantageous to avoid high temperatures during the condensation. Accordingly, it is recommended to effect the reaction at room temperature or with cooling; however, in appropriate instances, the temperature may be moderately increased. In the case of reaction of an ester with an amine, refluxing in a solvent can be used to advantage.

Moreover, it is often advantageous to effect the process of the invention in the presence of acidic or basic catalysts. Such catalysts include, for example, alkoxides such as sodium methylate, mineral acids such as hydrochloric acid, or organic acids such as p-toluenesulfonic acid. It is also appropriate to effect the reaction in the presence of materials which take up the water formed by the reaction, such as acetic anhydride, calcium chloride and sodium sulfate.

The isolation and purification of the end products of the reaction can be effected by chromatographic procedures or by electrophoresis, whereby the separation of unreacted material can be effected in an especially simple manner. Purification can also be effected by fractional precipitation using appropriate solvent mixtures, e.g., water/acetone. Finally, the products are obtained in pure form by crystallization.

When using an amine for the condensation, for example (1-α-D-ribofuranosyl-5,6-dimethylbenzimidazol)-3'-[(D-2-amino-1-methylethyl)-hydrogenphosphoric acid ester, in which the phosphoric acid radical is esterified with the 3'-positioned hydroxy group of the sugar moiety, a condensation product is formed, the steric structure of which allows for co-ordination of the dimethylbenzimidazole part with the central cobalt atom, the product thus formed being a complex compound of the type of vitamin $B_{12}$. In cases where the formation of such a complex compound is impossible, for example when using as the amine (1-α-D-ribofuranosyl-5,6-dimethyl-benzimidazol)-2'-[(D-2-amino-1-methyl)-hydrogen-phosphoric acid ester] in which the phosphoric acid radical is esterified with the 2'-positioned hydroxy group of the sugar moiety, an ion, for example the cyanide ion, will enter into the condensation product formed as the complex builder instead of the dimethylbenzimidazole. Such compounds possess physical properties and behave like the so-called incomplete cobalamines, in which the nucleotide moiety is completely lacking; furthermore, they have an activity which is different from that of the complete cobalamines.

The products of this invention represent vitamins of the $B_{12}$ group or analogs thereof; as such, they possess growth promoting properties, especially when applied to microorganisms.

The invention is further disclosed in the following examples, which are illustrative but not limitative thereof. All temperatures are indicated in degrees centigrade.

EXAMPLE 1

(a) Manufacture of the Amine Starting Material 350 mg. of a mixture of (1-α-D-ribofuranosyl-5,6-dimethylbenzimidazole)-3'- and -2'-dihydrogenphosphoric acid ester were dissolved in 2.5 ml. of 2 N ammonia and a mixture of 2.5 ml. of formamide, 1031.7 mg. of dicyclohexyl-carbodiimide and 6 ml. of tert.butyl alcohol was added thereto. The mixture was refluxed for 3 hours, after cooling freed in vacuo from the tert.butyl alcohol, 20 ml. of water were added, the mixture extracted 3 times with ether and the ether was discarded. Then the precipitated dicyclohexyl-urea was sucked off, the filtrate was concentrated in vacuo at 35° and finally dried in a highly evacuated desiccator. The residue was taken up in 30 ml. of acetone and a solution of 294 mg. of calcium iodide in 4 ml. acetone was added. The precipitate formed was centrifuged off, washed four times with 30 ml. each of acetone and finally dried in vacuo at room temperature. There were obtained 360 mg. of a water-containing calcium salt of (1-α-D-ribofuranosyl-5,6-dimethylbenzimidazol)-2',3'-hydrogenphosphoric acid ester, which formed a non-hygroscopic powder. This powder was homogeneous in the paper chromatogram (system isoamyl-alcohol/10% aqueous sodium carbonate, 1:1) and which shows the following ultra-violet absorption maxima:

in 0.05 N HCl: 277 m$\mu$, $E_1^1$=169; 285.5 m$\mu$, $E_1^1$=158; in 0.04 N KOH: 247 m$\mu$, $E_1^1$=161.5; 278.5 m$\mu$, $E_1^1$=103; 287.5 m$\mu$, $E_1^1$=101.

174 mg. of this calcium salt were dried in high vacuo at 100° for 1 hour over phosphorus pentoxide. Then, there were added thereto 1.9 ml. of DL-1-benzyloxycarbonylamino-2-propanol and 0.45 ml. of dioxan saturated with hydrogen chloride. The calcium salt was dissolved by strong agitation and the mixture was left standing at room temperature for 20 minutes. The major part of the hydrogen chloride was removed by storing the mixture over sodium hydroxide and the remaining part of the hydrogen chloride was neutralized by addition of a solution of ammonia in tert.butanol (1 part concentrated ammonia for 9 parts of tert.butanol). The ammonia in excess was removed by evacuation, the residue was taken up in about 30 ml. of water and 1 ml. of glacial acetic acid added. The DL-1-benzyloxycarbonylamino-2-propanol in excess was separated off by extraction with ether. Then, the aqueous phase was treated without any further purification with gaseous hydrogen in the presence of palladium catalyst for the purpose of splitting off the benzyloxycarbonyl group. The hydrogenated solution was then filtrated through a column of the ion-exchange resin Amberlite XE-64-H (1.5 x 70 cm.) and the column was then thoroughly washed with water. The ion-exchanger was then suspended in water, neutralized with ammonia and eluted with water. The eluate was concentrated in vacuo to a volume of about 4 ml. and chromatographed on a column of diethylaminoethyl-cellulose (DEAE-cellulose, 1.6 x 9.5 cm.). The fraction containing the reaction product was concentrated to about 1 ml. and again chromatographed on a somewhat smaller column. Water was used as eluant. Those fractions the absorption spectrum of which indicated that they contained the reaction product were concentrated in vacuo and dried. They yielded about 25 mg. of a colorless amorphous substance with the same absorption spectrum as the starting material: $E_1^1$=0.91 at 277 m$\mu$ (in 0.02 N hydrochloric acid). In the electrophoresis, the substance behaved neutral at pH 6.5, but showed acid properties at pH 10.5. In the paper chromatogram (n-butanol saturated with water), this substance runs with greater speed than the starting material and gives a violet coloration with ninhydrine. The substance consisted of a mixture of (1-α-D-ribofuranosyl-5,6-dimethylbenzimidazol) - 3' - [(DL-2-amino-1-methyl-ethyl)-hydrogenphosphoric acid ester] and (1-α-D-ribofuranosyl-5,6-dimethylbenzimidazol) - 2'-[(DL-2-amino-1-methyl-ethyl)-hydrogenphosphoric acid ester].

(b) Condensation 2.6 mg. of factor $V_{1a}$ were dissolved in 0.8 ml. of dry dimethyformamide and a solution of triethylamine in dimethylformamide was added thereto. The mixture was cooled ot —12° while agitating and 0.008 ml. of a freshly prepared 5% solution of ethylchloroformate in dimethyl formamide was added. The solution formed was kept at —12°.

On the other hand, 415 mg. of the mixture of (1-α-D-ribofuranosyl - 5,6 - dimethylbenzimidazol)-3'- and 2'-[(DL-2-amino-1-methyl-ethyl)-hydrogenphosphoric acid ester] prepared according to (a) were dissolved in 0.05 ml. of water, diluted with 0.4 ml. of dimethyl formamide and cooled to —12°. 0.005 ml. of 1 N sodium hydroxide solution was added, and immediately after this addition the solution of the phosphates was mixed with the solution of the mixed anhydride. The temperature was maintained for 30 minutes at 0°, then raised in the course of 20 minutes to 30° and finally kept at this level for 30 minutes. A trace of 10% hydrocyanic acid was added, the condensation products were precipitated by addition of an acetone-ether mixture and then filtrated off. The filtration residue was electrophoretically separated into 2 zones and purified further as follows:

ZONE 1

That zone which in the electrophoresis behaved neutral at pH 2.7 and which had a violet-red color, was eluted with water and chromatographed on a column of dimethylaminoethyl-cellulose (basic form, 0.6 x 2.0 cm.). The fraction running through with a red color was extracted with phenol and the phenol extract recrystalized from acetone in usual manner. The crystallized substance proved by its absorption spectrum, its behaviour in the paper chromatogram and in electrophoresis, to be identical with vitamin $B_{12}$. The biological activity thereof was about 80% of that of vitamin $B_{12}$ when tested on *L. leichmannii*, and about 78.5% when tested on *E. coli*. The yield was about 40%, as calculated on the basis of the starting factor $V_{1a}$.

ZONE 2

The zone that behaved basically upon electrophoresis at pH 2.7 and which had an orange-red color was eluted with water, whereupon the eluate was adsorbed on a column of phosphorylated cellulose (P-cellulose) and, after washing with water, eluted with a 0.6% aqueous hydrocyanic acid solution. The fraction running through with a violet color was concentrated in vacuo. The substance in its spectroscopic behaviour was similar to the dicyano form of vitamin $B_{12}$. Also in the paper-chromatogram it showed the same properties as dicyanocobalamine. In the electrophoresis the substance behaved as a base at pH 2.7, and had weakly acidic properties at pH 6.5. When tested on *E. coli* and *L. leichmannii*, it was almost inactive.

Upon degradation treatment with 70% perchloric acid, the product yielded a mixture of (1-α-D-ribofuranosyl-5,6-dimethylbenzimidazol)-3'- and 2'-dihydrogenphosphoric acid ester. This behaviour, as well as those described in the further examples, indicate that the substance of zone 2 represents a vitamin $B_{12}$, in which the phosphate radical is attached to the $C_2$-hydroxy group of the ribose (instead of the $C_3$-hydroxy group), the coordination of the dimethylbenzimidazole moiety with the cobalt atom being less favoured by the steric configuration than in the case of the isomeric product of zone 1.

EXAMPLE 2

(a) *Amine Starting Material*

6 mg. of the calcium salt of (1-α-D-ribofuranosyl-5,6-dimethylbenzimidazol)-2',3'-hydrogenphosphoric acid ester were mixed with 100 mg. of 1-benzylideneamino-2-propanol and 0.1 ml. of dimethylformamide, and the mixture was agitated until a clear solution was reached. 6 mg. of sodium tert.butylate were added and the mixture again agitated until everything was dissolved; finally, the mixture was allowed to stand for 20 minutes at room temperature. First 0.2 ml. of glacial acetic acid and then 3 ml. of water were added. The solution was concentrated in vacuo to a small volume. The residue was taken up in 3 ml. of water and chromatographed on a column of Amberlite XE-64 (0.8 x 9 cm.). Further purification according to Example 1 yielded about 1 mg. of (1-α-D-ribofuranosyl-5,6-dimethylbenzimidazol)-3'- and 2'-[(DL-2-amino-1-methyl-ethyl)-hydrogenphosphoric acid ester].

(b) *Separation of the Amine Mixture*

6 mg. of the product obtained above were dissolved in a small amount of water, brought onto a sheet of paper (Schleicher and Schüll 2043a) and subjected to ascending chromatography overnight. The developer was a mixture of 200 ml. of water, 10 g. of citric acid, 100 ml. of isoamyl alcohol and ammonia up to a pH of 8. The dried paper showed in the ultra-violet light two fluorescent zones with the $R_f$-values 0.72 (zone 1) and 0.80 (zone 2). The two zones were cut out of the paper, finely ground, each of them was filled in a diethylaminoethyl-cellulose column (1 x 10 cm., basic form) and eluated with water. After concentrating and drying, salt-free eluates of about mg. were obtained. Both substances showed the same ultra-violet absorption spectrum as (1-α-D-ribofuranosyl-5,6-dimethylbenzimidazol)-2'(3')-phosphate and gave a positive reaction with ninhydrine. As proven by the reaction described below, the product of zone 1 was (1-α-D-ribofuranosyl - 5,6 - dimethylbenzimidazol)-3'-[(DL-2-amino-1-methyl-ethyl)-hydrogenphosphoric acid ester], whereas the product of zone 2 consisted of (1-α-D-ribofuranosyl-5,6 - dimethylbenzimidazol)-2'-[(DL-2-amino-1-methyl-ethyl)-hydrogenphosphoric acid ester].

(c) *Condensation*

The product of zone 1, (1-α-D-ribofuranosyl-5,6-dimethylbenzimidazol - 3'-[(DL-2-amino-1-methyl-ethyl)-hydrogenphosphoric acid ester], was reacted with factor $V_{1a}$ as described in Example 1. By the electrophoretic separation of the crude condensation product, there was obtained, besides about 30% unreacted factor $V_{1a}$, a substance that behaved neutral at pH 2.7 and proved to be identical with the corresponding compound obtained according to Example 1. The substance behaving as a base at pH 2.7 was obtained in a very small amount. When condensing with (1-α-D-ribofuranosyl-5,6,dimethylbenzimidazol)-2'-[(DL-2-amino-1-methyl-ethyl)-hydrogenphosphoric acid ester], the electrophoretic separation of the crude condensation product yielded, besides unreacted starting material, practically only the substance that behaved basically at pH 2.7. This experiment proved that the two products formed during the condensation differ from each other only by the point of attachment on the ribose molecule ($C_2$-hydroxy or $C_3$-hydroxy group).

EXAMPLE 3

(a) *Amine Starting Material*

D-1-benzyloxycarbonylamino-2-propanol was reacted, as described in Example 1, with the calcium salt of (1 - α - D-ribofuranosyl-5,6-dimethylbenzimidazol)-2',3'-hydrogenphosphoric acid ester. The product obtained was a mixture of (1-α-D-ribofuranosyl-5,6-dimethylbenzimidazol)-2'- and 3'-[(D-2-amino-1-methyl-ethyl)-hydrogenphosphoric acid ester].

(b) *Condensation*

The reaction with factor $V_{1a}$ was performed as described in Example 1. The electrophoretic separation of the crude product yielded, besides unreacted starting material, a zone that behaved neutral at pH 2.7 and a basic zone. From the former, vitamin $B_{12}$ was isolated; it was in every respect identical with natural vitamin $B_{12}$ and possessed full biological activity when tested on *L. leichmannii* and *E. coli*. The part of the condensation product that was basic at pH 2.7 and that was obtained in about the same yield as the neutral part, had the same properties as the corresponding products described in Example 1 and was biologically almost entirely inactive.

This substance differs from neutral vitamin $B_{12}$ in that the phosphate radical is attached to the $C_2$-hydroxy group of the ribose (instead of the $C_3$-hydroxy group).

EXAMPLE 4

464 mg. of a mixture of (1-α-D-ribofuranosyl-5-methoxybenzimidazol)-3'- and 2'-dihydrogenphosphoric acid ester were converted, as indicated in Example 1, into the cyclic phosphate [(1-α-D-ribofuranosyl-5-methoxybenzimidazol)-2',3'-dihydrogenphosphoric acid ester]. This product showed the following absorption maxima: 288 mμ, $E_1^1$=131.5 (in 0.05 N hydrochloric acid); 247.5 and 289.5 mμ, $E_1^1$=157 and 100 (in 0.04 N potassium hydroxide). The yield was 482 mg. 50 mg. of this calcium salt were mixed with 0.5 ml. of DL-1-benzyloxycarbonylamino-2-propanol and 0.13 ml. of dioxan, which was saturated with hydrogen chloride. This mixture was agitated for 20 minutes, then freed over sodium hydroxide of the excess hydrogen chloride and neutralized with ammoniacal tert. butanol. After concentrating to a volume of about 2 ml., 0.25 ml. of glacial acetic acid and 5 ml. of water were added. Unreacted DL-1-benzyloxycarbonylamino-2-propanol was extracted with ether. The reaction product was treated as described in Example 1 in order to hydrogenolyse off the benzyloxycarbonyl group. Then, it was passed through a column of Amberlite XE-64 (1.0 x 30 cm.) and through a column of diethylaminoethyl-cellulose (0.6 x 7 cm.). The fractions containing the reaction product were concentrated to dryness in vacuo and yielded about 8 mg. of a colorless amorphous substance, which had the same absorption spectrum as the nucleotide of factor III*m*. It represented a mixture (1-α-D-ribofuranosyl-5-methoxybenzimidazol)-2'- and 3'-[(DL-2-amino-1-methyl-ethyl)-hydrogenphosphoric acid ester]. This mixture was reacted with 2.6 mg. of factor $V_{1a}$, as described in Example 1, thereby yielding besides 1 mg. of factor III*m* about the same amount of an isomeric substance, the phosphate group of which is attached to the $C_2$-hydroxy group of the ribose. The synthetic factor III*m* differs neither in the paper chromatogram nor with respect to its absorption spectrum from a product prepared by methylation of natural factor III. The biological activity, too, is the same when tested on *Escherichia coli* 113-3, *Euglena saccharophila* and *Ochromonas malhamensis*.

EXAMPLE 5

In the same manner as described in Example 1, a mixture of the two isomeric phosphoric acid esters (1-α-D-ribofuranosyl-5,6-dimethylbenzimidazol)-2′- and 3′-[(2-aminoethyl)-hydrogenphosphoric acid ester] is prepared by using instead of 1-benzyloxycarbonylamino-2-propanol 19.2 g. of 2-benzyloxycarbonylamino-1-ethanol. Thus, 15 mg. of the said phosphoric acid esters are obtained, which when reacted with 17.5 mg. of factor $V_{1a}$ in the same manner as in Example 1, give 7 mg. each of two isomeric compounds that differ from each other in the point of attachment of the phosphate radical to the ribose molecule. In the one compound, the phosphate radical is attached to the $C_2$-hydroxy group, whereas in the other compound, the point of attachment is the $C_3$-hydroxy group. The properties of these two substances, in which the 1-amino-2-propanol radical of vitamin $B_{12}$ is replaced by the 2-amino-1-ethanol radical, are given in the following Table I.

EXAMPLE 6

In the same manner as described in Example 2, a mixture of the two isomeric phosphoric acid esters (1-α-D-ribofuranosyl - 5,6 - dimethylbenzimidazol) - 2′ - and 3′-[(DL-2-amino-3-phenylpropyl)-hydrogenphosphoric acid ester] was prepared by using 1 g. of DL-2-benzylideneamino-3-phenyl-1-propanol instead of 1-benzylideneamino-2-propanol. 15 mg. of a crystalline compound were obtained, which was reacted with 60 mg. of factor $V_{1a}$ in the same manner as indicated in Example 1. The electrophoretic separation yielded 4.2 mg. of a vitamin $B_{12}$ analogon, in which the 1-amino-2-propanol radical is replaced by the 2-amino-3-phenyl-1-propanol radical, and 38 mg. of the isomeric compound having the phosphate radical attached to the $C_2$-hydroxy group of the ribose. The properties of both substances are indicated in the following table I.

EXAMPLE 7

In the same manner as described in Example 2, a mixture of the two isomeric phosphoric acid esters (1-α-D-ribofuranosyl - 5,6 - dimethylbenzimidazol) - 2′ - and 3′-[(DL-2-amino-1-phenyl-ethyl)-hydrogenphosphoric acid ester] was prepared by using 1 g. of DL-2-benzylideneamino-1-phenyl-1-ethanol instead of 1-benzylideneamino-2-propanol. Thus 30 mg. of a microcrystalline substance were obtained, M.P. 155–158°. 2 mg. of this compound were reacted as described in Example 1 with 2.6 mg. of factor $V_{1a}$. There was thus obtained 0.3 mg. of a vitamin $B_{12}$ analogon that contained the DL-2-amino-1-phenyl-1-ethanol group instead of the 1-amino-2-propanol group, besides 1.7 mg. of the isomeric compound having the phosphate radical attached to the $C_2$-hydroxy group of the ribose. The properties of these substances are indicated in the following Table I.

EXAMPLE 8

In the same manner as described in Example 2, a mixture of the two isomeric phosphoric acid esters (1-α-D-ribofuranosyl - 5,6 - dimethylbenzimidazol) - 2′ - and 3′-[(L-2-methyl-2-aminoethyl)-hydrogenphosphoric acid ester] was prepared by using 1 g. of L-2-benzylideneamino-1-propanol instead of 1-benzylideneamino-2-propanol. 15 mg. of an amorphous glassy product was obtained. This product was reacted with 60 mg. of factor $V_{1a}$ as indicated in Example 1. The electrophoretic separation yielded 4.2 mg. of a vitamin $B_{12}$ analogon, in which the 1-amino-2-propanol radical is replaced by the L-2-methyl-2-amino-ethanol radical, and 37.8 mg. of the isomeric compound having the phosphate radical attached to the $C_2$-hydroxy group of the ribose. The properties of both substances are indicated in the following Table I.

TABLE I.—$R_f$-VALUES OF THE VITAMIN $B_{12}$ ANALOGS OBTAINED ACCORDING TO EXAMPLES 5–8

| Aminoalcohol replacing the D-1-amino-2-propanol present in the vitamin $B_{12}$ molecule | | $R_f$-values (vitamin $B_{12}$ =1.0) | | |
|---|---|---|---|---|
| | | X | Y | Z |
| 2-Amino-1-ethanol (Example 5) | a | 0.91 | 1.03 | 0.91 |
| | b | 0.9 | 1.06 | 1.02 |
| DL-2-Amino-3-phenyl-1-propanol (Example 6) | a | 1.31 | 1.23 | 1.32 |
| | b | 1.2 | 1.23 | 1.21 |
| DL-2-Amino-1-phenyl-1-ethanol (Example 7) | a | 1.4 | 1.15 | 1.42 |
| | b | 1.31 | 1.37 | 1.36 |
| L-2-Amino-1-propanol (Example 8) | a | 1.0 | 1.06 | 1.0 |
| | b | 1.02 | 1.13 | 1.17 |

(a) Phosphate radical attached to the $C_3$-hydroxy group of the ribose.
(b) Phosphate radical attached to the $C_2$-hydroxy group of the ribose.
System of developers for the paper chromatography:
  X: water-saturated 2-butanol (100 parts) and glacial acetic acid (1 part).
  Y: 2-butanol (50 parts), water (18 parts) and 25% ammonia (7 parts).
  Z: water-saturated 2-butanol.
To each one of the systems X and Y was added 0.1 part, and to the system Z 0.02 part of 10% hydrocyanic acid solution.

We claim:
1. Process which comprises condensing a compound containing the cation of cobyrinic acid *abcdeg*-hexamide with an amine of the formula

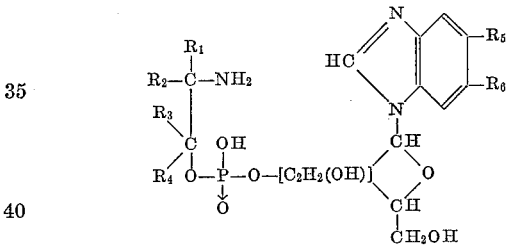

wherein $R_1$ is selected from the group consisting of hydrogen, alkyl, aryl, and phenyl-lower alkyl groups, $R_2$, $R_3$ and $R_4$ are selected from the group consisting of hydrogen, alkyl groups, aryl and carbalkoxy, and $R_5$ and $R_6$ are selected from the group consisting of hydrogen, halogen, alkyl, alkoxy, hydroxy, mercapto and alkylmercapto groups.

2. The process of claim 1, wherein (1-α-D-ribofuranosyl - 5,6 - dimethylbenzimidazol) - 3′ - [(DL - 2 - amino-1-methyl-ethyl)-hydrogenphosphoric acid ester] represents the amine.

3. The process of claim 1, wherein (1-α-D-ribofuranosyl - 5,6 - dimethylbenzimidazol) - 3′ - [(D - 2 - amino-1-methyl-ethyl)-hydrogenphosphoric acid ester] represents the amine.

4. The process of claim 1, wherein (1-α-D-ribofuranosyl - 5,6 - dimethylbenzimidazol) - 3′ - [(DL-2-amino-1-methyl-ethyl)-hydrogenphosphoric acid ester] represents the amine.

5. A process which comprises reacting an anhydride resulting from the reaction of the cation of cobyrinic acid-*abcdeg*-hexamide with a chloroformic acid ester with the amine of claim 1.

References Cited in the file of this patent
FOREIGN PATENTS
845,030     Great Britain _____ Aug. 17, 1960

UNITED STATES PATENT OFFICE
CERTIFICATE OF CORRECTION

Patent No. 3,120,509                        February 4, 1964

Konrad Bernhauer et al.

It is hereby certified that error appears in the above numbered patent requiring correction and that the said Letters Patent should read as corrected below.

Column 5, line 7, for "-1-methyl)" read -- -1-methylethyl) --; column 6, line 32, for "cooled ot" read -- cooled to --; line 36, for "415 mg." read -- 4.15 mg. --; column 7, line 49, for "eluated" read -- eluted --; line 50, after "about" insert -- 3 --; column 10, line 58, for " [(DL-2-amino-" read -- [(L-2-amino- --.

Signed and sealed this 7th day of July 1964.

(SEAL)
Attest:

ERNEST W. SWIDER
Attesting Officer

EDWARD J. BRENNER
Commissioner of Patents